(12) United States Patent
Wybenga et al.

(10) Patent No.: US 7,362,763 B2
(45) Date of Patent: Apr. 22, 2008

(54) APPARATUS AND METHOD FOR CLASSIFYING TRAFFIC IN A DISTRIBUTED ARCHITECTURE ROUTER

(75) Inventors: Jack C. Wybenga, Plano, TX (US); Patricia K. Sturm, Dallas, TX (US); Patrick W. Ireland, Sanger, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 10/655,192

(22) Filed: Sep. 4, 2003

(65) Prior Publication Data

US 2005/0053074 A1   Mar. 10, 2005

(51) Int. Cl.
H04L 12/28 (2006.01)
H04L 12/56 (2006.01)
G06F 15/173 (2006.01)

(52) U.S. Cl. .............. 370/395; 370/392; 370/401; 709/238

(58) Field of Classification Search ........ 370/230–351, 370/389–395, 401–412, 466–474; 709/226–238, 709/242
See application file for complete search history.

(56) References Cited

U.S. PATENT DOCUMENTS

| | | | |
|---|---|---|---|
| 6,078,963 A * | 6/2000 | Civanlar et al. ............ 709/238 |
| 6,157,644 A * | 12/2000 | Bernstein et al. ............ 370/392 |
| 6,259,699 B1 * | 7/2001 | Opalka et al. ............ 370/398 |
| 6,341,130 B1 | 1/2002 | Lakshman et al. |
| 6,577,634 B1 * | 6/2003 | Tsukakoshi et al. ... 370/395.31 |
| 7,031,320 B2 * | 4/2006 | Choe ...................... 370/395.31 |
| 2002/0126672 A1 * | 9/2002 | Chow et al. ................. 370/392 |
| 2003/0067925 A1 * | 4/2003 | Choe et al. ................. 370/400 |
| 2003/0161319 A1 * | 8/2003 | Okagawa et al. ......... 370/395.4 |
| 2004/0111426 A1 * | 6/2004 | Kim et al. ................... 707/100 |
| 2004/0114518 A1 * | 6/2004 | MacFaden et al. ...... 370/230.1 |
| 2004/0153573 A1 * | 8/2004 | Kim et al. ................... 709/242 |
| 2004/0156371 A1 * | 8/2004 | Kumar et al. ............... 370/401 |
| 2004/0165604 A1 * | 8/2004 | Oh et al. ..................... 370/401 |

* cited by examiner

Primary Examiner—Man U. Phan

(57) ABSTRACT

A router for interconnecting N interfacing peripheral devices. The router comprises a switch fabric and routing nodes coupled to the switch fabric. Each routing node comprises: i) a plurality of physical medium device (PMD) modules for transmitting data packets to and receiving data packets from selected ones of the N interfacing peripheral devices; ii) an input-output processing (IOP) module coupled to the PMD modules and the switch fabric for routing the data packets between the PMD modules and the switch fabric and between the PMD modules; and iii) a classification module associated with the IOP module for classifying a first data packet received from the IOP module. The classification module causes the IOP module to forward the first data packet based on the classification. The router architecture incorporates streams-based billing support, firewall capabilities, and data surveillance functionality.

25 Claims, 4 Drawing Sheets

APPARATUS AND METHOD FOR CLASSIFYING TRAFFIC IN A DISTRIBUTED ARCHITECTURE ROUTER

TECHNICAL FIELD OF THE INVENTION

The present invention relates to massively parallel routers and, more specifically, to a massively parallel, distributed architecture router that performs traffic classification and related services normally performed by peripheral devices at network access points.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, increasingly, routers are the cause of major bottlenecks in the Internet.

Early routers resided on a computer host and the CPU of the host performed all tasks, such as packet forwarding via a shared bus and routing table computation. This simple, centralized architecture proved to be inefficient due to the concentrated overhead of the CPU and the existence of congestion on the bus. As a result, router vendors developed distributed router architectures that provide efficient packet processing compared to a centralized architecture. Some distributed router architectures distribute many of the functions previously performed by the centralized CPU to the line cards, and a high-speed crossbar switch replaces the shared bus. This greatly increases the throughput of routers and reduces bottlenecks on the Internet.

Despite increased complexity and sophistication, the primary function of most massively parallel, distributed routers remains relatively simple: routing (or forwarding) data packets from an ingress port to the correct egress port. Peripheral devices at the network access points perform more sophisticated functions, such as security (anonymity), firewall protection, data surveillance, and the like.

Recently, however, telecommunication equipment vendors have begun to develop and to disclose distributed routers that do more than simple routing and forwarding functions. U.S. patent application Ser. No. 10/431,770, filed on May 8, 2003 and U.S. patent application Ser. No. 10/460,995, filed on Jun. 13, 2003 disclose distributed router architectures that use classification modules on forwarding nodes to perform IPv6 forwarding and non-traditional router functions. U.S. patent application Ser. Nos. 10/431,770 and 10/460,995 are assigned to the assignee of the present application. The subject matter disclosed in U.S. patent application Ser. Nos. 10/431,770 and 10/460,995 is hereby incorporated into the present application as if fully set forth herein.

Nonetheless, peripheral devices located at the access points of a communication network continue to perform many functions that may be performed by routers of the communication network. Therefore, there is a need in the art for an improved Internet protocol (IP) router. In particular, there is a need for a massively parallel, distributed architecture router that is capable of performing functions (i.e., services) that are conventionally performed by peripheral devices located at the network edges.

SUMMARY OF THE INVENTION

To address the above-discussed deficiencies of the prior art, it is a primary object of the present invention to provide a router for interconnecting N interfacing peripheral devices. According to an advantageous embodiment of the present invention, the router comprises: 1) a switch fabric; and 2) a plurality of routing nodes coupled to the switch fabric, each of the routing nodes comprising: i) a plurality of physical medium device (PMD) modules capable of transmitting data packets to and receiving data packets from selected ones of the N interfacing peripheral devices; ii) an input-output processing (IOP) module coupled to the PMD modules and the switch fabric and capable of routing the data packets between the PMD modules and the switch fabric and between the PMD modules; and iii) a classification module associated with the IOP module for classifying a first data packet received from the IOP module, wherein the classification module causes the IOP module to forward the first data packet based on the classification.

According to one embodiment of the present invention, the classification module classifies the first data packet based on at least one of Layer 2 through Layer 7 of the ISO model.

According to another embodiment of the present invention, the classification module is capable of modifying header information of the first data packet.

According to still another embodiment of the present invention, the classification module replaces at least one of a medium access control (MAC) address and an Internet Protocol (IP) address of the first data packet with a replacement address selected from a pool of addresses associated with the router.

According to yet another embodiment of the present invention, the classification module causes the IOP module to forward the first data packet based on a traffic type of the first data packet.

According to a further embodiment of the present invention, the classification module causes the IOP module to forward the first data packet based on a source of the first data packet.

According to a still further embodiment of the present invention, the classification module causes the IOP module to forward the first data packet based on a destination of the first data packet.

According to a yet further embodiment of the present invention, the classification module causes the IOP module to forward the first data packet based on a content of a user payload of the first data packet.

In one embodiment of the present invention, the classification module comprises a classification engine and a content addressable memory.

In another embodiment of the present invention, the classification module is programmable.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged distributed router.

Figure 1:
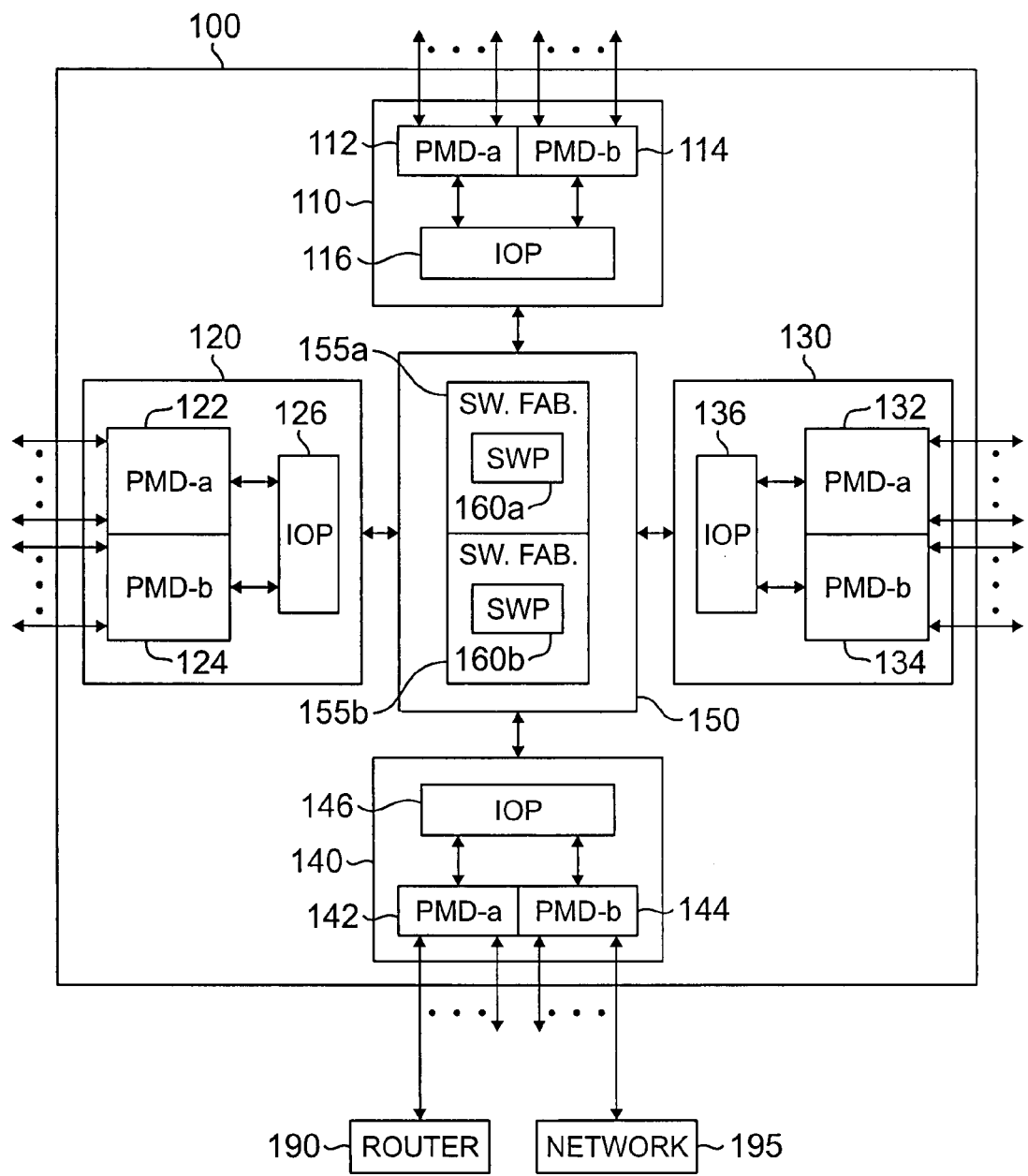
FIG. 1 illustrates an exemplary distributed architecture router, which implements classification modules according to the principles of the present invention.

FIG. 1 illustrates exemplary distributed architecture router 100, which implements classification modules according to the principles of the present invention. Distributed architecture router 100 provides scalability and high-performance using up to N independent routing nodes (RN), including exemplary routing nodes 110, 120, 130 and 140, connected by switch 150, which comprises a pair of high-speed switch fabrics 155*a* and 155*b*. Each routing node comprises an input-output processor (IOP) module, and one or more physical medium device (PMD) module. Exemplary RN 110 comprises PMD module 112 (labeled PMD-a), PMD module 114 (labeled PMD-b), and IOP module 116. RN 120 comprises PMD module 122 (labeled PMD-a), PMD module 124 (labeled PMD-b), and IOP module 126. RN 130 comprises PMD module 132 (labeled PMD-a), PMD module 134 (labeled PMD-b), and IOP module 136. Finally, exemplary RN 140 comprises PMD module 142 (labeled PMD-a), PMD module 144 (labeled PMD-b), and IOP module 146.

Each one of IOP modules 116, 126, 136 and 146 buffers incoming Internet protocol (IP) frames and MPLS frames from subnets or adjacent routers, such as router 190 and network 195. Additionally, each of IOP modules 116, 126, 136 and 146 classifies requested services, looks up destination addresses from frame headers or data fields, and forwards frames to the outbound IOP module. Moreover, each IOP module also maintains an internal routing table determined from routing protocol messages and provisioned static routes and computes the optimal data paths from the routing table. Each IOP module processes an incoming frame from one of its PMD modules. According to one embodiment of the present invention, each PMD module encapsulates an incoming frame (or cell) from an IP network (or ATM switch) for processing in an IOP module and performs bus conversion functions.

Each one of routing nodes 110, 120, 130, and 140, configured with an IOP module and PMD module(s) and linked by switch fabrics 155*a* and 155*b*, is essentially equivalent to a router by itself. Thus, distributed architecture router 100 can be considered a set of RN building blocks with high-speed links (i.e., switch fabrics 155*a* and 155*b*) connected to each block. Switch fabrics 155*a* and 155*b* support frame switching between IOP modules. Switch processor (SWP) 160*a* and switch processor (SWP) 160*b*, located in switch fabrics 155*a* and 155*b*, respectively, support system management.

Unlike a traditional router, distributed architecture router 100 requires an efficient mechanism of monitoring the activity (or "aliveness") of each routing node 110, 120, 130, and 140. Distributed architecture router 100 implements a routing coordination protocol (called "loosely-coupled unified environment (LUE) protocol") that enables all of the independent routing nodes to act as a single router by maintaining a consistent link-state database for each routing node. The loosely-unified environment is (LUE) protocol is based on the design concept of OSPF (Open Shortest Path First) routing protocol and is executed in parallel by daemons in each one of RN 110, 120, 130, and 140 and in SWP 160*a* and SWP 160*b* to distribute and synchronize routing tables. As is well known, a daemon is an agent program that continuously operates on a processing node and provides resources to client systems. Daemons are background processes used as utility functions.

Figure 2:
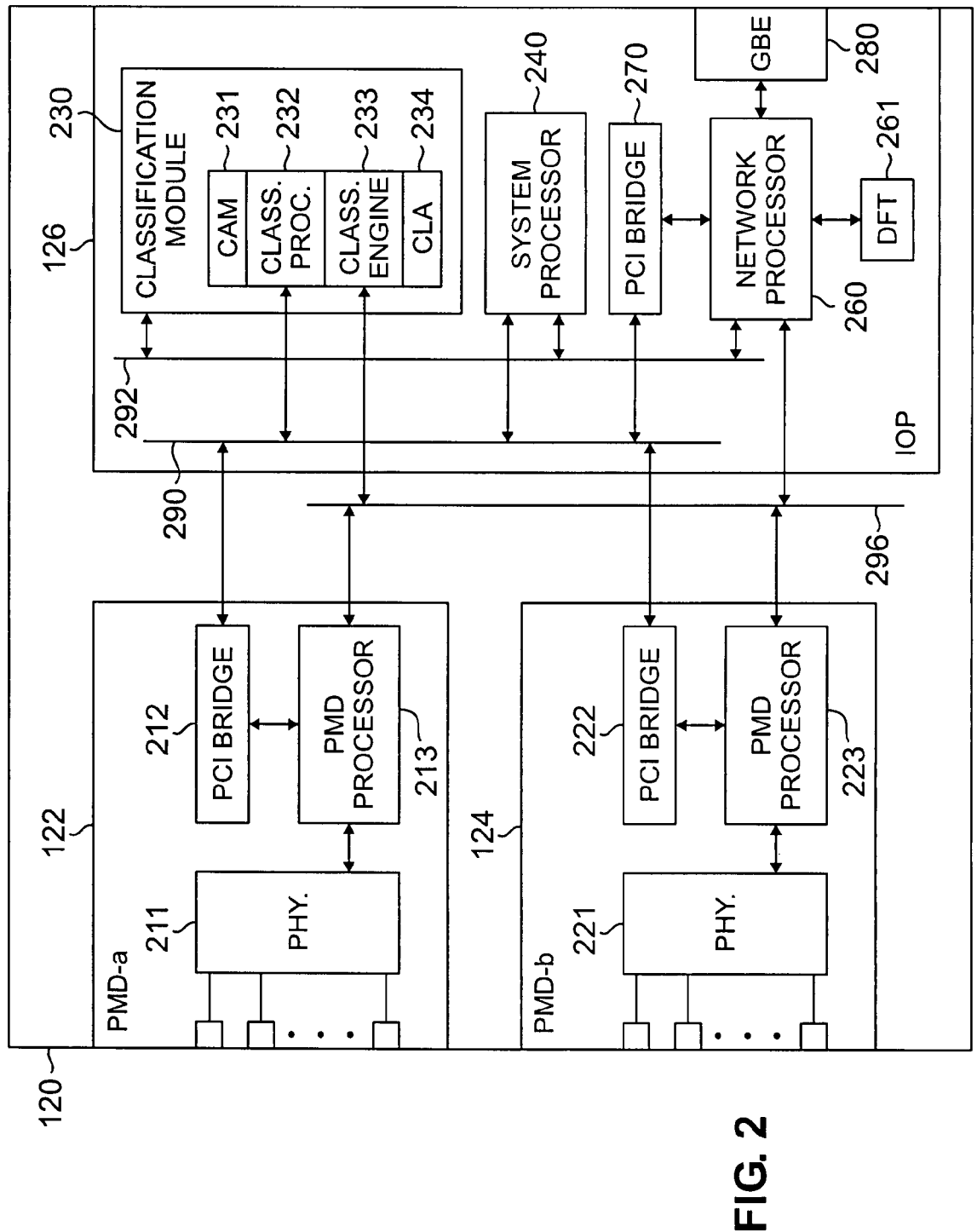
FIG. 2 illustrates selected portions of an exemplary routing node in the distributed architecture router in FIG. 1 according to one embodiment of the present invention.

FIG. 2 illustrates selected portions of exemplary routing node 120 in distributed architecture router 100 according to one embodiment of the present invention. Router 100 shares routing information in the form of aggregated routes among the routing engines. The routing engines are interconnected through Gigabit optical links to the switch modules (SWMs). Multiple SWMs can be interconnected through 10 Gbps links. Classification module 230 is an optional daughter card that may be inserted on any or all IOP modules.

Ingress data can be sent to classification modules 230 to enable, for example, IPv6 tunneling through router 100, streams-based billing, subnet independent NAT, Layers 4-7 and QoS-based forwarding, data filtering and blocking for firewall functionality, and data surveillance, among other functions.

Routing node 120 comprises physical medium device (PMD) module 122, physical medium device (PMD) module 124 and input-output processor module 126. PMD module 122 (labeled PMD-a) comprises physical layer circuitry 211, physical medium device (PMD) processor 213 (e.g., IXP 1240 processor), and peripheral component interconnect (PCI) bridge 212. PMD module 124 (labeled PMD-b) comprises physical layer circuitry 221, physical medium device (PMD) processor 223 (e.g., IXP 1240 processor), and peripheral component interconnect (PCI) bridge 222.

IOP module 126 comprises classification module 230, system processor 240 (e.g., MPC 8245 processor), network processor 260 (e.g., IXP 1200 or IXP 1240 processor), peripheral component interconnect (PCI) bridge 270, and Gigabit Ethernet connector 280. Classification module 230 comprises content addressable memory (CAM) 231, classification processor 232 (e.g., MPC 8245 processor), classification engine 233 and custom logic array (CLA) 234 (e.g., FPGA). Classification engine 233 is a state graph processor. Custom logic array 234 controls the flow of the packet within classification module 230 and between classification module 230 and network processor 260. PCI bus 290 connects PCI bridges 212, 222 and 270, classification processor 232, and system processor 240 for control plane data exchange such as route distribution. IX bus 296 interconnects PMD processor 213, PMD processor 223, and network processor 260 for data plane traffic flow. Local bus 292 interconnects classification module 230 and network processor 260 for data plane traffic flow.

Network processor 260 comprises microengines that perform frame forwarding and a control plane processor. Network processor 260 uses distributed forwarding table (DFT) 261 to perform forwarding table lookup operations. The network processor (e.g., network processor 260) in each IOP module (e.g., IOP module 126) performs frame forwarding using a distributed forwarding table (e.g., DFT 261).

Figure 3:
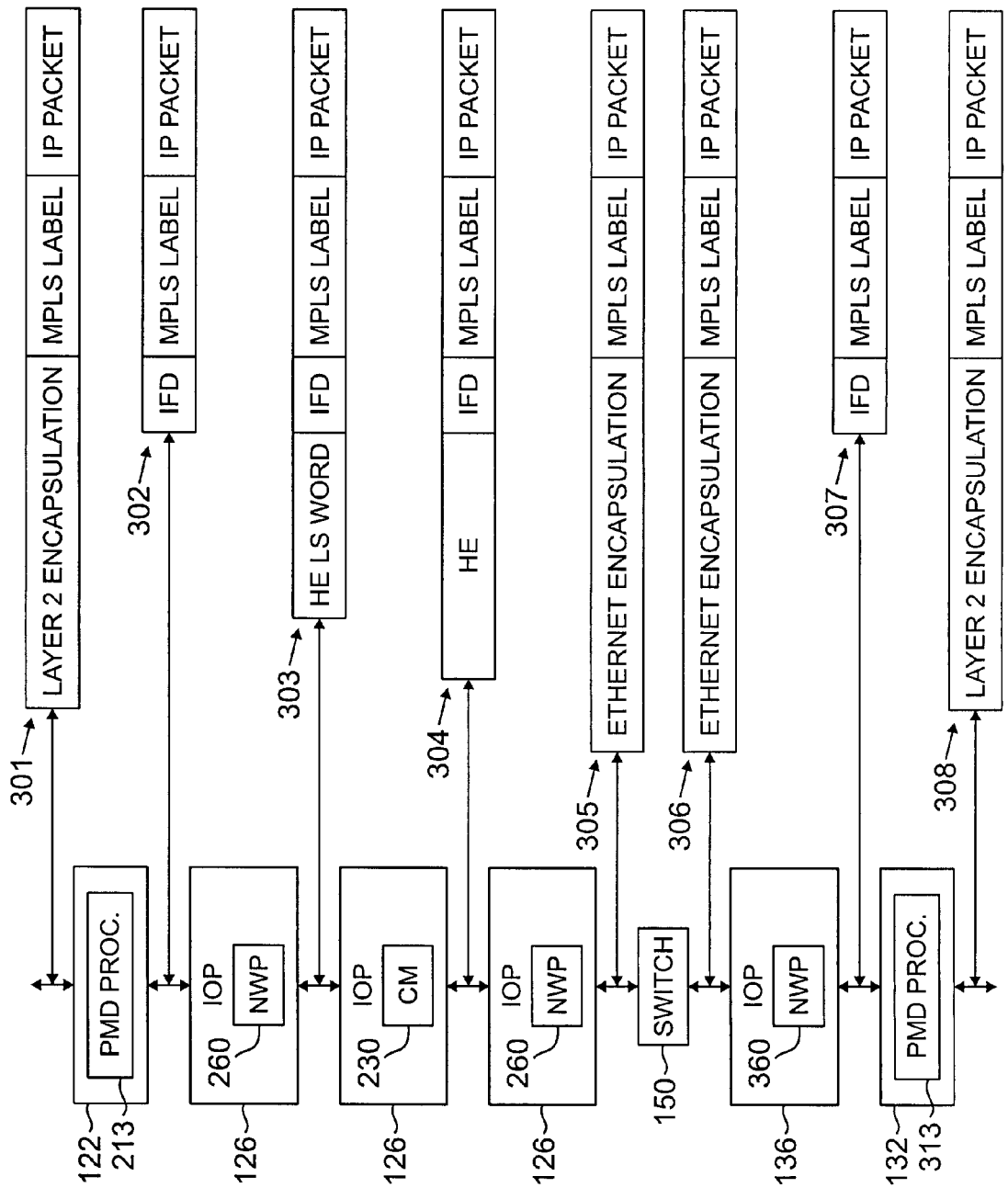
FIG. 3 is a flow diagram illustrating packet format states at various stages in the exemplary distributed architecture router according to one embodiment of the present invention.

FIG. 3 is a flow diagram illustrating packet format states at various stages in exemplary distributed architecture router 100 according to one embodiment of the present invention. Data packets 301-308 illustrate the stage-by-stage progress of a representative data packet. As FIG. 3 shows, router 100 uses proprietary headers to transport data packets within router 100. It is noted that an MPLS Label is optionally included in data packets 301-308 for purposes of illustration only. The MPLS Label may not be present with the IPv4 and IPv6 data packets.

Initially, PMD module 122 receives data packet 301 from an external network device. Data packet 301 comprises a Layer 2 Encapsulation field, an MPLS label (optional) and an Internet Protocol (IP) packet. PMD processor 213 in PMD module 122 removes the Layer 2 Encapsulation field and adds an Interface Descriptor (IFD) field to form data packet 302, which PMD module 122 transfers to IOP module 126.

If classification is needed, network processor 260 in IOP module 126 adds a header extension least significant (HE LS) word to the IFD field, the MPLS Label (optional), and the IP packet to form data packet 303, which network processor 260 transfers to classification module 230 in IOP module 126. Classification module 230 then adds the rest of the header extension (HE) and fills in the matching address from CAM 231 to form data packet 304, which CM 230 transfers back to network processor 260.

Next, network processor 260 uses the header extension and IFD fields of data packet 304 to look up the destination address in distributed forwarding table 261. Once the destination address is determined, network processor 260 formats the packet for the output interface. If the destination address is accessed through a different IOP module, then the header extension and IFD fields are dropped and the Ethernet Encapsulation is added, thereby forming data packet 305, which IOP module 126 transfers to switch 150. If the destination address is part of the same IOP module, then the header extension field is dropped and the packet with IFD is sent by IOP module 126 to PMD 122 or PMD 124.

Data packet 305 then passes through switch 150. At the output, switch 150 forwards data packet 306, which is identical to data packet 305, to IOP module 136. Network processor 360 in IOP module 136 is similar to network processor 260. Network processor 360 removes the Ethernet Encapsulation field of data packet 306 and adds an IFD field to form data packet 307, which IOP module 136 transfers to PMD module 132. Finally, PMD processor 313 removes the IFD field and adds a Layer 2 Encapsulation field to form data packet 308. PMD module 132 then transmits data packet 308 to an external device in the network.

According to the principles of the present invention, router 100 uses classification module 230 in each IOP module to provide other functions in addition to conventional routing and forwarding functions. Classification module 230 primarily supports Internet Protocol Version 6 (IPv6) forwarding and streams-based billing. However, once implemented in an IOP module, classification module 230 may be programmed to perform many other "non-traditional" router functions.

These functions include:

i) Security—Classification module 230 may achieve anonymity by translating Layer 2 and 3 addresses. The actual Medium Access Control (MAC) and Internet Protocol (IP) addresses may be isolated to the user interface by translating the addresses to a pool of router addresses. The network side interfaces do not see the user addresses because the router addresses are used on the network side.

ii) Firewall—Classification module 230 may restrict access to user ports to certain traffic types, traffic sources, and/or traffic destinations. It also supports implementation of Access Control Lists (ACLs).

iii) Data Surveillance—Classification module 230 may search for key words or phrases in user data packet payloads.

iv) Configuration Independence—Classification module 230 is capable of making the interfaces subnet of router 100 independent by providing a subnet independent Network Address Translation (NAT) in classification engine 233. This allows laptops to remain configured to their home location IP address and to connect to a router interface in a remote location. The laptop connects to a router interface on a different subnet without changing its configuration. Although Internet providers use dynamic IP address assignment, the laptop still must be configured with the subnet address of the provider. This present invention eliminates the need for this configuration. Allowing only known MAC addresses or IP addresses to gain entry provides security.

v) Higher Level Routing—Classification module 230 is capable of performing routing and forwarding based on Layers 4-7 of the ISO model and QoS fields.

Figure 4:
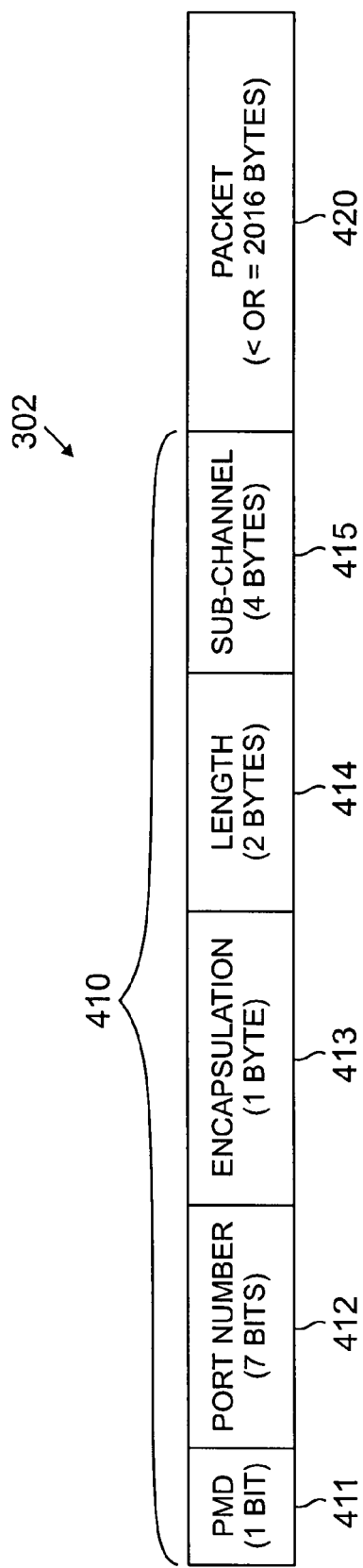
FIG. 4 illustrates in greater detail a data packet at the PMD-IOP interface according to an exemplary embodiment of the present invention.

FIG. 4 illustrates data packet 302 in greater detail according to an exemplary embodiment of the present invention. Data packet 302 comprises interface descriptor (IFD) 410 and packet payload 420 and is transferred in both directions between PMD module 122 and IOP module 126. Data packet 302 may also comprise optional MPLS label 430 between IFD 410 and packet payload 420. However, for the purposes of simplicity and clarity in explaining the present invention, optional MPLS label 430 is not shown in FIG. 4. Exemplary interface descriptor (IFD) 410 comprises eight (8) bytes. The first byte of IFD 410 comprises physical medium device (PMD) field 411 (1 bit) and port number field 412 (7 bits). IFD 410 also comprises encapsulation field 413 (1 byte), length field 414 (2 bytes) and sub-channel field 415 (4 bytes). Packet payload 420 comprises up to 2016 bytes and is equivalent to data packets 305 and 306 or may be just an IP packet. Thus, packet payload 420 comprises an optional Ethernet encapsulation field, an optional MPLS label field, and an IP packet.

PMD field 411 may be either a Logic 0 (for PMD-a) or a Logic 1 (for PMD-b). Port number field 412 gives the physical port number of the associated interface in the PMD. Encapsulation field 413 may contain, for example, (00)hex for IPv4 data, (01)hex for MPLS unicast data, (02)hex for MPLS multicast data, or (03)hex for IPv6 data. The value in length field 414 includes both IFD 410 and packet payload 420. Finally, sub-channel field 414 specifies, ATM-VPI/VCI or TDM channel numbers.

Figure 5:
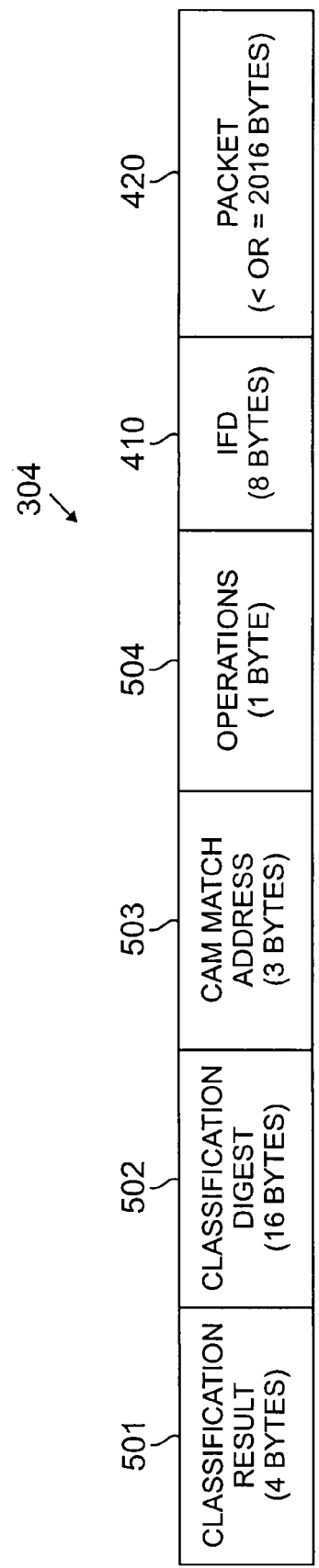
FIG. 5 illustrates in greater detail a data packet in a classification module according to an exemplary embodiment of the present invention.

FIG. 5 illustrates data packet 304 in greater detail according to an exemplary embodiment of the present invention. Data packet 304 comprises interface descriptor (IFD) 410 and packet payload 420, as in FIG. 3. Data packet 304 may also comprise optional MPLS label 430 between IFD 410 and packet payload 420. However, for the purposes of simplicity and clarity in explaining the present invention, optional MPLS label 430 is not shown in FIG. 5.

Data packet 304 also comprises an additional 24 bytes of the header extension (HE) field. The header extension field comprises classification result field 501 (4 bytes), classification digest field 502 (16 bytes), content addressable memory (CAM) match address field 503 (3 bytes) and operations field 504 (1 byte) Together, the header extension field and IFD 410 form an Extended Interface Descriptor (EIFD), which can be used for forwarding table lookup by the routing engines.

Data packets sent from IOP module 126 to classification module 230 start at CAM match address field 503 and do not contain classification result field 501 and classification digest field 502. Data packets sent from classification module 230 to IOP module 126 contain all of the fields of data packet 304 shown in FIG. 5.

IFD 410 enables a PMD module (e.g., PMD module 122) to provide information about data packet 302, such as Layer 2 information, port number, subchannel, and packet length, to the routing engine of the IOP module (e.g., IOP module 126). In order to provide maximum flexibility in classification, IFD 410 and a one byte operations field are provided to the classification engine (e.g., CE 233) of classification module (CM) 230. The operations field enables network processor 260 of IOP module 126 to provide instructions to classification module 230.

As noted above, classification module 230 comprises classification engine (CE) 233 and content addressable memory (CAM) 231. Classification engine 233 may classify data packet 304 based on any field in data packet 304, including operations field 504, IFD 410, Layer 3 through Layer 7 headers, and data content in packet payload 420. Custom logic array (CLA) 234 adds the 4 bytes of classification result field 501 and up to 16 bytes of classification digest field 502 that may be extracted from any portion of packet payload 420 provided by classification engine 233. CAM 231 performs a lookup on a 144-bit portion of the 160 bits (total) contained in classification result field 501 and classification digest field 502. The 144-bit field is software selectable. CAM 231 returns 24-bit match address in CAM match address field 503.

Data flow in router 100 may be described as follows. Data packets enter a line interface, such as the Gigabit Ethernet (GbE) PMD module 122, travel through PHY layer 211, and are delivered to the microengines of PMD processor 213. PMD processor 213 attaches Interface Descriptor (IFD) 410, which provides information to IOP module 126 about the packet source and type (e.g., port, encapsulation, subchannel, and packet length). The PMD 213 microengines send the packets to the microengines of network processor 260 over Internet exchange (IX) bus 296.

The microengines of network processor 260 determine whether the data packets need to go to classification module (CM) 230. If so, space is reserved for the results from classification module 230 (i.e., fields 501, 502, and 503) and operations field 504 is added. The packets are then sent to CM 230 over local bus 292 with the last word of the header extension (HE) field added. As explained above with respect to FIG. 5, the header extension field is an extension to IFD 410 for use by CM 230. The header extension field has space reserved for classification results field 501, classification digest field 502, and CAM match address field 503.

Custom logic array (CLA) 234 on CM 230 handles the flow of packets through CM 230, providing them to classification engine 233 and CAM 231, as necessary. CM 230 adds classification results field 501, classification digest field 502, and CAM match address field 530 as part of the extended packet header (i.e., EIFD). When CM 230 is finished with the packet, the microengines in network processor 260 are notified and the microengines read data packet 304 (including the EIFD) over local bus 292. Network processor 260 then forwards the data packet to the destination, with IFD 410 included if the data packet is going to PMD module 122 (or 124) and without IFD 410 included if the data packet is going to switch 150. Fields in the Extended IFD may be used by network processor 260 for performing forwarding table lookups in order to determine the destination.

The Ethernet Encapsulation field is added by IOP module 126 to the data packets going to switch 150. When the packets reach the destination IOP module (e.g., IOP module 136), the Ethernet Encapsulation field is removed and IFD 410 is added. The destination IOP 136 then forwards the packets to PMD module 132 or to PMD module 134, where IFD 410 is removed, the appropriate ISO model Layer 2 framing is added, and the packet is transmitted out of the network interface.

As explained above, CM 230 enables support for additional functions (or services), such as IPv6 forwarding, stream based billing, Layer 4-7 forwarding, QoS-based forwarding, Network Address Translation (NAT), user anonymity services, firewall protection, support for Access Control List (ACL) implementation, and data surveillance. Thus, CM 230 extends router 100 functionality beyond the functionality of traditional routers.

Classification module 230 provides IPv6 forwarding. CE 233 extracts the destination address and provides it to CAM 231. CAM 231 performs a lookup on the IPv6 destination address and provides the match address. The routing engines use the match address as input to the forwarding table lookup in DFT 261. CM 230 may identify particular data streams, such as sessions to particular network locations, by examining HyperText Transfer Protocol (http) headers. CM 230 also may also distinguish and separately process other data types, such as voice, video, and data.

This allows billing based on data type and location. To aid in this billing, custom logic array 234 may increment a packet counter in memory. The counter incremented is the counter indexed by the value in CAM match address field 503. Classification processor 232 reads these counters and sends the related billing information over PCI bus 290 to network processor 260. Network processor 260 injects this billing information into the data stream where it can be sent to a billing application, such as a Remote Authentication Dial-In User Service (RADIUS) server located within router 100, or where it can be sent out a network interface to an external billing application.

Network Address Translation (NAT) by classification module 230 allows subnet independent connections. For example, a laptop can be configured for its home subnet. When transported to a remote office location, the laptop can connect to a different subnet through router 100 without changing its own configuration. CM 230 may be used to translate the IP address to a router pool of network addresses. This is particularly useful for laptops using wireless networks, such as IEEE 802.11b. Although many internet providers dynamically assign IP addresses, it still is necessary for the computer to be configured with the internet provider's subnet. Subnet independent NAT in router 100 does not require this subnet configuration change.

Since router 100 can use subnet independent NAT to translate IP addresses, this also enables user anonymity. The Layer 2 and Layer 3 addresses on the user network may be hidden from the destination network. The user IP address is confined to the private network of the user. An address from the pool of network addresses in router 100 is used on the public network.

Classification module 230 may classify the packet based on any portion of the packet, including packet payload 420. This allows filtering and blocking of packets based on header content or data content, or both. This is useful for firewall implementation where it is desirable to control what types of data are permitted to flow through the system and what source and destination addresses are permitted. Traditionally, firewalls in routers control traffic at the packet level by packet filtering, where packets are allowed to pass through the router or are blocked from passing through the router based on source address, destination address, or port number, or any comination of these factors.

Typically, host computers control traffic on the application level based upon more detailed information, such as traffic type and Layer 4 through Layer 7 information. The process that examines and forwards the packet traffic is called a proxy service. Proxy-based firewalls often are independent of the Layer 2 and 3 protocols. Proxy-based firewalls can provide a higher level of security because packet filtering firewalls have less control over the traffic actually getting to the host. CM 230 allows router 100 to operate as both a packet-based firewall and a proxy-based firewall. CM 230 permits host level filtering to take place inside router 100. Finally, since classification module 230 is able to examine the entire packet, including both the headers and the data, CM 230 can perform data surveillance. For example, it can be used to search for key words or phrases in the data stream. Advantageously, classification module 230 is capable of classifying and controlling the forwarding of data packets based on any combination of two or more of the classification criteria described above (i.e., traffic type, source, destination, header data, payload content, and so forth), thereby allowing the implementation of sophisticated filtering and other functions.

Although the present invention has been described with an exemplary embodiment, various changes and modifications may be suggested to one skilled in the art. The present invention is intended to encompass such changes and modifications as fall within the scope of the appended claims.

What is claimed is:

1. A router for interconnecting N interfacing peripheral devices, said router comprising:
a switch fabric; and
a plurality of routing nodes coupled to said switch fabric, each of said routing nodes comprising:
a plurality of physical medium device (PMD) modules to transmit data packets to and receiving data packets from selected ones of said N interfacing peripheral devices;
an input-output processing (IOP) module coupled to said PMD modules and said switch fabric, wherein said IOP module routes said data packets between said PMD modules and said switch fabric and between said PMD modules; and
a classification module associated with said IOP module for classifying a first data packet received from said IOP module, wherein said classification module causes said IOP module to forward said first data packet based on said classification, and
wherein said classification module replaces at least one of: a medium access control (MAC) address and an Internet Protocol (IP) address of said first data packet with a replacement address selected from a pool of addresses associated with said router.

2. The router as set forth in claim 1 wherein said classification module classifies said first data packet based on at least one of Layer 2 through Layer 7 of the ISO model.

3. The router as set forth in claim 2 wherein said classification module modifies header information of said first data packet.

4. The router as set forth in claim 3 wherein said classification module causes said IOP module to forward said first data packet based on a traffic type of said first data packet.

5. The router as set forth in claim 3 wherein said classification module causes said IOP module to forward said first data packet based on a source of said first data packet.

6. The router as set forth in claim 3 wherein said classification module causes said IOP module to forward said first data packet based on a destination of said first data packet.

7. The router as set forth in claim 3 wherein said classification module causes said IOP module to forward said first data packet based on a content of a user payload of said first data packet.

8. The router as set forth in claim 3 wherein said classification module comprises a classification engine and a content addressable memory.

9. The router as set forth in claim 8 wherein said classification module is programmable.

10. A communication network comprising a plurality of routers to transmit data packets to and receiving data packets from each other and from interfacing peripheral devices associated with said communication network, a first one of said plurality of routers comprising:
a switch fabric; and
a plurality of routing nodes coupled to said switch fabric, each of said routing nodes comprising:
a plurality of physical medium device (PMD) modules to transmit data packets to and receiving data packets from selected ones of said N interfacing peripheral devices;
an input-output processing (IOP) module coupled to said PMD modules and said switch fabric, wherein said IOP module routes said data packets between said PMD modules and said switch fabric and between said PMD modules; and
a classification module associated with said IOP module for classifying a first data packet received from said IOP module, wherein said classification module causes said IOP module to forward said first data packet based on said classification, and
wherein said classification module replaces at least one of a medium access control (MAC) address and an Internet Protocol (IP) address of said first data packet with a replacement address selected from a pool of addresses associated with said router.

11. The communication network as set forth in claim 10 wherein said classification module classifies said first data packet based on at least one of Layer 2 through Layer 7 of the ISO model.

12. The communication network as set forth in claim 11 wherein said classification module modifies header information of said first data packet.

13. The communication network as set forth in claim 12 wherein said classification module causes said IOP module to forward said first data packet based on a traffic type of said first data packet.

14. The communication network as set forth in claim 12 wherein said classification module causes said IOP module to forward said first data packet based on a source of said first data packet.

15. The communication network as set forth in claim 12 wherein said classification module causes said IOP module to forward said first data packet based on a destination of said first data packet.

16. The communication network as set forth in claim 12 wherein said classification module causes said IOP module to forward said first data packet based on a content of a user payload of said first data packet.

17. The communication network as set forth in claim 12 wherein said classification module comprises a classification engine and a content addressable memory.

18. The communication network as set forth in claim 17 wherein said classification module is programmable.

19. A method for use in a router comprising: i) a switch fabric; ii) physical medium device (PMD) modules for transmitting data packets to and receiving data packets from N interfacing peripheral devices; iii) input-output processing (IOP) modules coupled to the PMD modules and the switch fabric for routing the data packets between the PMD modules and the switch fabric and between the PMD modules, the method comprising the steps of:
in a classification module associated with one of the IOP modules, classifying a first data packet received from the IOP module;
causing the IOP module to forward the first data packet based on the classification of the first data packet; and
replacing at least one of a medium access control (MAC) address and an Internet Protocol (IP) address of the first data packet with a replacement address selected from a pool of addresses associated with the router.

20. The method as set forth in claim 19 wherein the step of classifying the first data packet comprises the step of classifying the first data packet based on at least one of Layer 2 through Layer 7 of the ISO model.

21. The method as set forth in claim 19 further comprising the step of modifying header information of the first data packet.

22. The method as set forth in claim 21 wherein the step of causing the IOP module to forward the first data packet comprises the step of causing the IOP module to forward the first data packet based on a traffic type of the first data packet.

23. The method as set forth in claim 21 wherein the step of causing the IOP module to forward the first data packet comprises the step of causing the IOP module to forward the first data packet based on a source of the first data packet.

24. The method as set forth in claim 21 wherein the step of causing the IOP module to forward the first data packet comprises the step of causing the IOP module to forward the first data packet based on a destination of the first data packet.

25. The method as set forth in claim 21 wherein the step of causing the IOP module to forward the first data packet comprises the step of causing the IOP module to forward the first data packet based on a content of a user payload of the first data packet.

* * * * *